(No Model.)
J. G. ARCHER.
POLE FOR HAY GATHERERS.
No. 437,471. Patented Sept. 30, 1890.
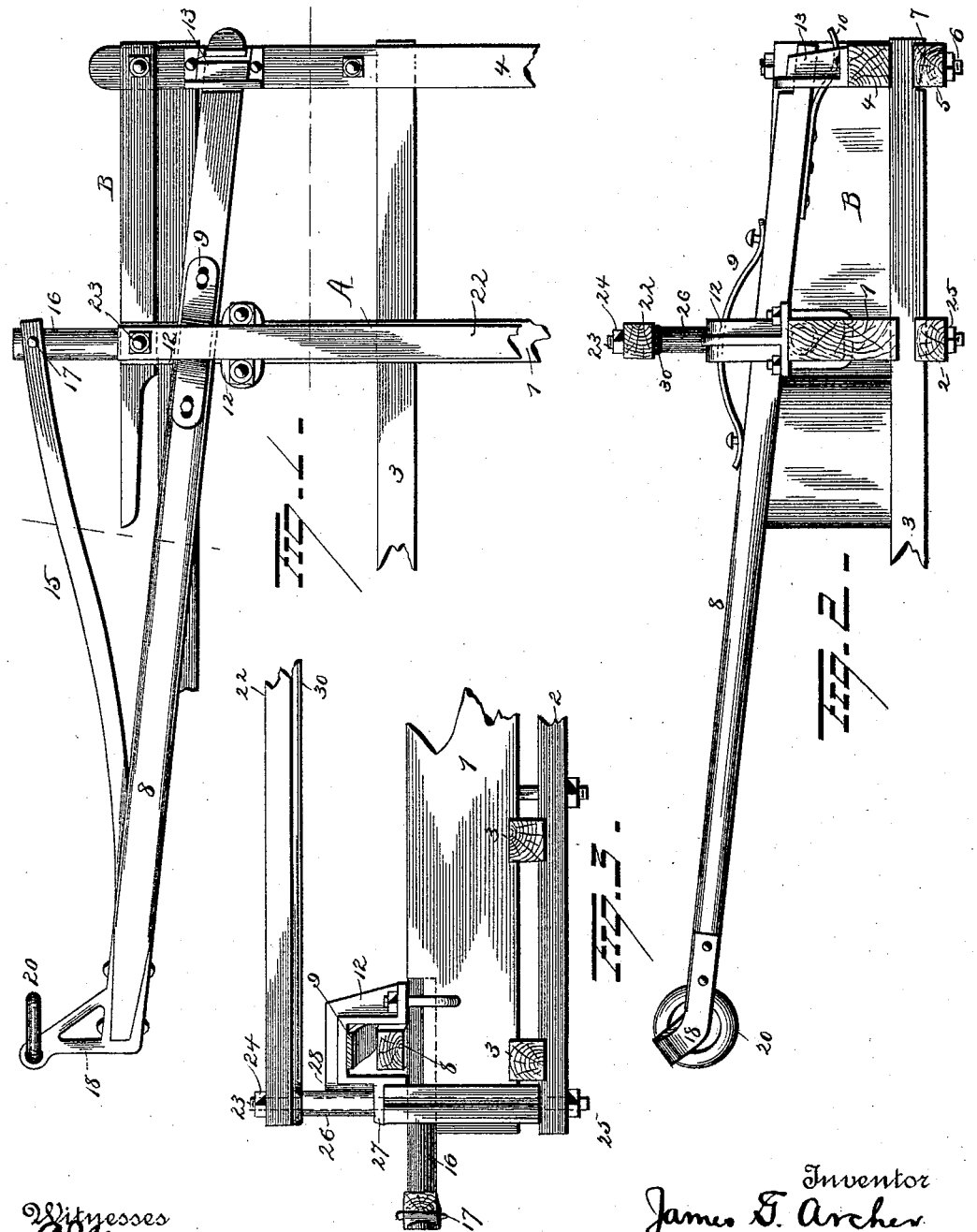
Witnesses
E. J. Nottingham
G. F. Downing
Inventor
James G. Archer
By his Attorney
H. A. Seymour

UNITED STATES PATENT OFFICE.

JAMES GARDNER ARCHER, OF BROOKFIELD, MISSOURI.

POLE FOR HAY-GATHERERS.

SPECIFICATION forming part of Letters Patent No. 437,471, dated September 30, 1890.

Application filed June 12, 1890. Serial No. 355,248. (No model.)

*To all whom it may concern:*

Be it known that I, JAMES GARDNER ARCHER, of Brookfield, in the county of Linn and State of Missouri, have invented certain new and useful Improvements in Poles for Hay-Gatherers; and I do hereby declare the following to be a full, clear, and exact description of the invention, such as will enable others skilled in the art to which it appertains to make and use the same.

My invention relates to an improvement in poles for hay-gatherers, the object being to provide a pole which may be easily attached to or detached from a rake, and one in which the strain is relieved; and with this end in view my invention consists in certain novel features of construction and combinations of parts, as will be hereinafter described, and pointed out in the claims.

In the accompanying drawings, Figure 1 is a plan view. Fig. 2 is a sectional view; and Fig. 3 is a view in transverse section, taken immediately in front of beams 1 and 2.

A represents the cross-head of the rake, to which my improved pole is attached. This cross-head is composed of the beams 1 and 2, and B is a side of the rake in which an end of the beam 1 is tenoned, the lower beam 2 being secured in place beneath the beam 1 by suitable bolts or equivalent means. The sides are intended to prevent the hay or straw from getting into the wheels, and to this end they project forward some distance beyond the cross-head, sufficient to pass the wheel of whatever size and protect it from the hay.

The rake-teeth 3 3 are held between the beams 1 and 2, they passing through notches formed in each, and at their rear extremities these teeth are held by the parallel beams 4 and 5, which are also held together by bolts or other means 6 6, and to hold these teeth in place a dovetailed joint 7 is formed at these points, inclining notches being formed in the teeth and also in the lower beam 5.

The numeral 8 indicates the tongue or pole. The pole proper is provided with a pair of plate-springs 9 and 10 on its upper and lower face, as shown, the lower one conveniently protruding a short distance beyond the rear end of the pole, allowing the pole to move in any direction and thus accommodate itself to different-sized teams and unevenness of ground and at the same time prevent wear by the constant rubbing of parts. The portion of the pole where the springs are secured and located extends through the brackets or stirrups 12 and 13, located on the beams 1 and 4, respectively. The pole is provided with a brace 15, which is secured to one side thereof. The rear end of this brace extends over the end of the axle 16 outside of the wheel, where it is held by a pin 17, thus bracing the pole and also holding it in place on the hay-gatherer.

The pole is provided at its outer end with a laterally-projecting arm 18. This arm is preferably made to extend along the outer end of the pole some distance, embracing it on both sides, and along this portion the arm is secured to the pole by bolts, rivets, or the like. A ring 20 is held in the outer end of the arm, to which the strap from the draft-animal's collar is attached.

The axle 16 is preferably hollow, and its inner end is sunk about half-way into a groove or recess formed in the upper edge of the beam 1 and half-way into a similar recess formed in the lower edge of the bracket 12, whereby it is held in the frame of rake.

A cross-bar 22, extending across the front of the cross-head in the same vertical plane as the beams 1 and 2, is held at its ends by a bolt 23, which extends through the axles and through the sides and beams 1 and 2, it preferably being threaded at each end and adapted to receive nuts 24 and 25, whereby it is held in place and the aforesaid parts are rigidly held together as one. The portion of this rod between the cross-bar 22 and the side passes through a sleeve 26, and this sleeve is held between the cross-bar and a lateral projection 27, through which it passes. This bracket is also provided with a vertical flange 28, which rests upon or is formed integral with the sleeve. To assist in bracing the frame a rod 30 extends across the cross-head from bolts 23 immediately beneath the cross-bar 22.

It is evident that slight changes might be resorted to in the form and arrangement of the several parts described without departing from the spirit and scope of my invention, and hence I do not wish to limit myself to the exact construction herein set forth; but, Having fully described my invention, what

I claim as new, and desire to secure by Letters Patent, is—

1. In a hay-gatherer, the combination, with a rake, of a pole having spring-plates thereon at points where it has contact with the rake-head, substantially as set forth.

2. The combination, with a cross-head, axle projecting therefrom, and brackets or stirrups, of a pole having spring-plates thereon at points where it passes into the brackets, a brace secured to the pole, and means for holding the brace on the axle, substantially as set forth.

3. The combination, with beams, sides, cross-bar, axle, and bolt or bolts passing through said parts, of brackets or stirrups on the beams, a removable pole having spring-plates thereon to support the pole yieldingly within the brackets, a brace secured to the side of the pole, and means for holding the brace on the axle, substantially as set forth.

In testimony whereof I have signed this specification in the presence of two subscribing witnesses.

JAMES GARDNER ARCHER.

Witnesses:
C. W. FREEMAN,
C. T. CARTER.